Figure 1:
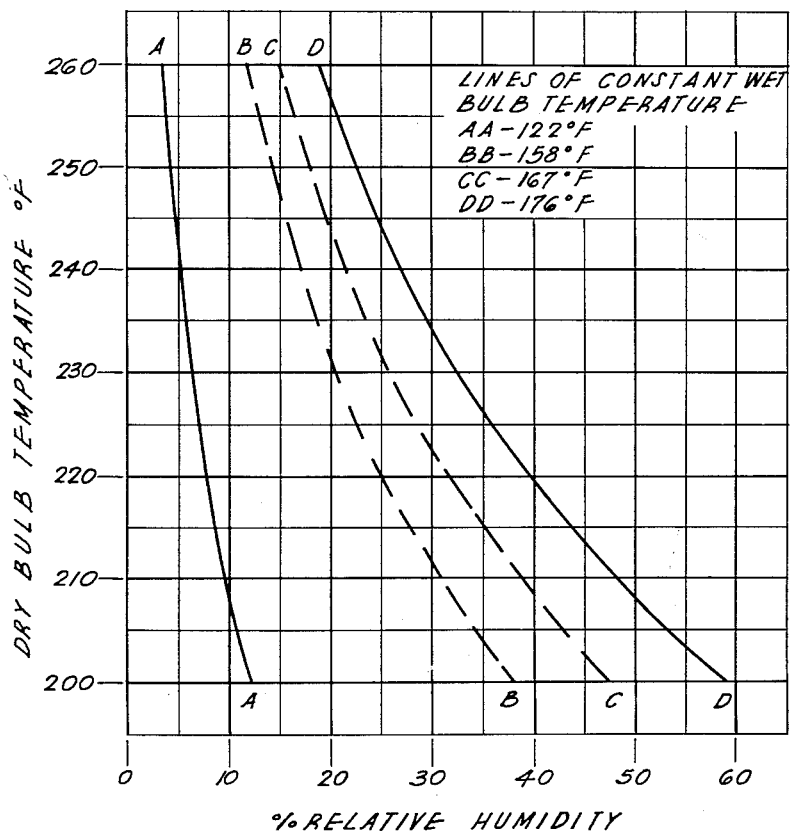

May 23, 1961 T. H. ROBERTSON ET AL 2,984,912
ART OF PRODUCING FILAMENTARY POLYACRYLONITRILE
Filed Aug. 14, 1958 2 Sheets-Sheet 2

INVENTORS.
THOMAS H. ROBERTSON,
GEORGE K. KLAUSNER
BY
Harold L. Kauffman
ATTORNEY.

United States Patent Office 2,984,912
Patented May 23, 1961

2,984,912
ART OF PRODUCING FILAMENTARY POLYACRYLONITRILE

Thomas H. Robertson, Stamford, and George K. Klausner, Norwalk, Conn., assignors to American Cyanamid Company, New York, N.Y., a corporation of Maine Filed Aug. 14, 1958, Ser. No. 755,020

8 Claims. (Cl. 34—23)

This application is a continuation-in-part of our copending application Serial No. 601,061, filed July 30, 1956, now abandoned.

This invention relates broadly to the art of producing filamentary polyacrylonitrile, and more particularly is concerned with a new and improved method of collapsing the structure of gelled filamentary material comprised of water and an acrylonitrile polymer containing a major proportion by weight of combined acrylonitrile.

Various methods of producing filaments, films and other shaped articles from homopolymeric acrylonitrile and from copolymers of a major proportion of acrylonitrile and a minor proportion of another monomer or monomers heretofore have been suggested. For example, in Rein U.S. Patent No. 2,117,210, dated May 10, 1938, it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in Latham U.S. Patent 2,404,714; Rogers U.S. Patents 2,404,715 and -725; Hansley U.S. Patent 2,404,716; Houtz U.S. Patents 2,404,713-722, -724 and -727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom.

Another method of producing filaments and other shaped products from polymers (homopolymers) and copolymers of acrylonitrile is disclosed and claimed in Cresswell U.S. Patent No. 2,558,730, dated July 3, 1951. The invention disclosed and claimed in that patent is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly, a concentrated aqueous salt solution of the kind disclosed by Rein in his U.S. Patent No. 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly, it was found that by keeping the temperature of the aqueous coagulating bath at or below +10° C., e.g., within the range of −15° C. to +10° C. and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product.

Still other methods of producing filamentary material from a polymer of acrylonitrile are known. For example, British Patent No. 714,530 describes a method wherein a thread is formed from a spinning solution containing a polyacrylonitrile and, as a solvent therefor, a mixture consisting essentially of water, one or more water-miscible, aliphatic liquids containing an alcoholic hydroxyl group and not more than 6 carbon atoms in the molecule, and one or more highly water-soluble salts of a particular class which includes the alkali-metal thiocyanates. In another process of producing threads from a polymer of acrylonitrile (British Patent No. 732,135), a solution of the polyacrylonitrile in a concentrated aqueous solution of a water-soluble salt that yields highly hydrated ions in an aqueous solution is extruded into an aqueous coagulating bath in which is dissolved at least 5% by weight of the same water-soluble salt used as a solvent for the polymer, the coagulating bath also containing a water-miscible alcohol.

Although processes such as are described briefly above and more fully in the aforementioned patents are, for the most part, operative and satisfactory in forming useful filamentary materials from homopolymeric and many different copolymeric acrylonitriles, processing improvements are often necessary in order to develop optimum properties in the product and/or to reduce its manufacturing cost. For example, and as is stated in Hare et al. U.S. Patent No. 2,677,590 and in Moody U.S. Patent No. 2,677,591, each dated May 4, 1954, the wet-spinning techniques described in the aforementioned Houtz U.S. Patent No. 2,426,719, in Watkins U.S. Patent No. 2,451,- 420, dated October 12, 1948, and in Hare U.S. Patent No. 2,467,553, dated April 19, 1949 (wherein, in all cases, the acrylonitrile polymer is dissolved in an organic solvent), yield dense, lustrous, high-tenacity yarns from acrylonitrile polymers; but the spinning speed and the productivity are limited. The patentees, Hare et al. and Moody, state that a stop speed of 100 yards per minute is obtained with glycerol as a coagulating bath, but that when less expensive aqueous salt solution is used as the coagulating bath, the spinning speeds are more of the order of 50 yards per minute. They further point out that it is desirable, from the standpoint of production economy, to spin a large number of filaments at high rates of speed into an inexpensive coagulating bath (e.g., water) from which the solvent for the polymer can be readily recovered; but that this results in yarns having varying degrees of porosity, depending upon the spinning conditions; and that such porous yarns lack strength and luster, and their use in the textile art is extremely limited. The solution of Hare et al. to the problem was to wet the stretched, porous, polyacrylonitrile article with a volatile, liquid non-solvent for the polymer (e.g., water), and then to contact the thusly wetted article with a fluid (e.g., xylene) which also is a non-solvent for the polymer and which is immiscible with the aforementioned volatile, liquid non-solvent. The immiscible fluid is heated to a temperature of at least 100° C., but below the thermal decomposition point of the polymer, thereby to evaporate the volatile, liquid non-solvent from the polymer and to render the article substantially non-porous. Moody's solution was to subject the porous, filamentary, polyacrylonitrile article, wet with water, to lateral pressure against a solid surface at a temperature of at least 100° C., but below the thermal decomposition point of the polymer, until the water is removed and the polyacrylonitrile article is substantially non-porous. The heated surface could be a heated roll, round pin or a curved plate.

The problems encountered by Hare et al. and Moody when using a spinning solution comprised of a polymer of acrylonitrile dissolved in an organic solvent are generally non-existent when using a spinning solution comprised of an acrylonitrile polymer dissolved in a concentrated aqueous solution of a water-soluble salt which yields highly hydrated ions in an aqueous solution, e.g., a thiocyanate and specifically sodium thiocyanate; and extruding this solution into a cold (not exceeding +10° C.) aqueous coagulating bath comprised of water alone or having dissolved therein from, for example, about 3% to about 20% by weight thereof of the same salt used in making the solvent for the acrylonitrile polymer, e.g., sodium thiocyanate. However, there does exist the same problem of collapsing the structure of the filamentary polyacrylonitrile in gel (specifically aquagel or hydrogel) state to a dense, compact solid while simultaneously removing the liquid phase (specifically water) therefrom. One would normally except that the voids in such a gelled structure would expand or become enlarged by the application of heat, due to the action of the expanding water and its evolution from the mass; and that heat (either dry or humid) would be ineffective in satisfactorily collapsing the structure.

Figure 2:
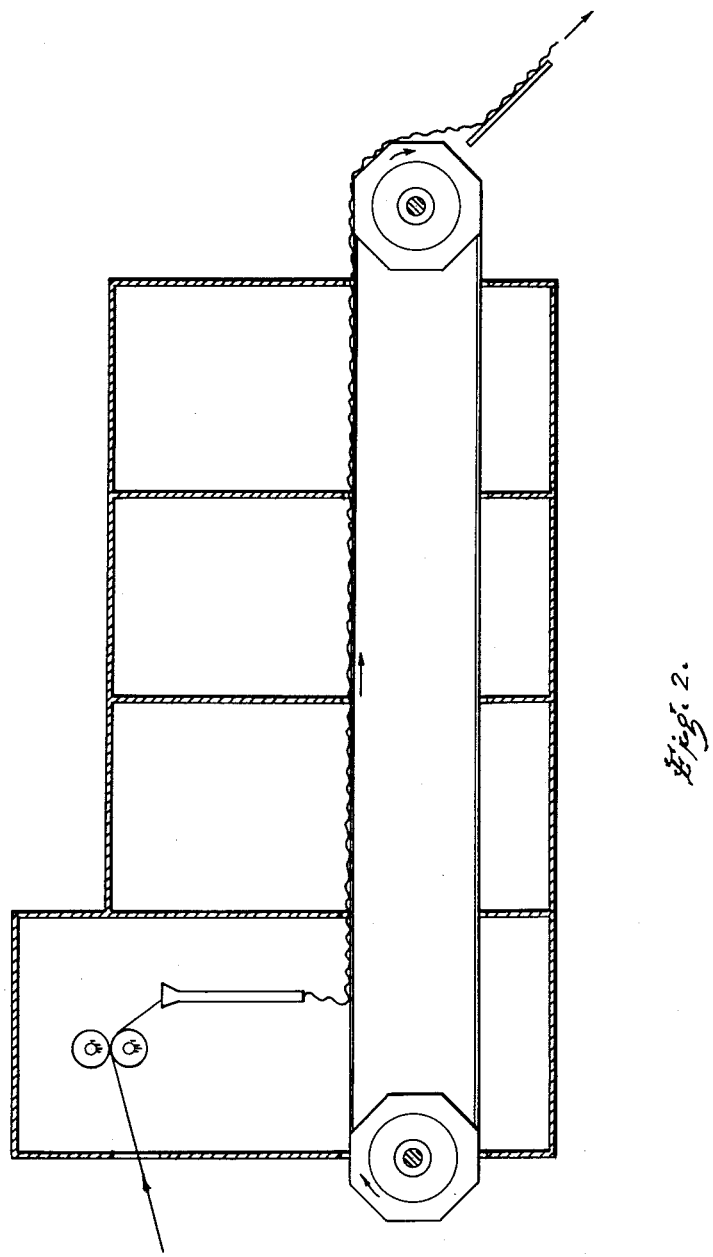

The novel features which are characteristic of our invention are set forth in the appended claims. The invention itself, however, will best be understood by reference to the following more detailed description when considered in connection with the accompanying drawing in which Fig. 1 is a graph of dry-bulb temperature in ° F. vs. minimum and maximum relative humidities that should be employed in collapsing the structure of gelled, filamentary, polyacrylonitrile material of the kind with which this invention is concerned thereby to obtain the desired results; and Fig. 2 illustrates somewhat schematically one type of dryer that can be used in practicing the invention.

The present invention is based on our discovery that the structure of gelled, filamentary material comprised of water and an acrylonitrile polymer containing a major proportion by weight of combined acrylonitrile can be effectively and economically collapsed, and substantially uniform products of improved properties (e.g., better and more uniform dye receptivity, better abrasion resistance and "hand," less tendency to fibrillate, etc.) can be obtained by drying the said filamentary material under particular and critical correlated conditions of temperature and humidity. Specifically, we have discovered that, in order to secure these results, the dry-bulb temperature should be within the range of from 200° F. to 260° F. and the minimum and maximum percentages of relative humidity should be those corresponding to wet-bulb temperatures of 122° F. and 176° F., respectively. Such lines of constant wet-bulb temperature are shown as solid lines A—A and D—D in the graph constituting Fig. 1 of the accompanying drawing. Preferably, the desired results are achieved when the dry-bulb temperature is in the range of from 200° F. to 260° F. and the minimum and maximum percentages of relative humidity are those corresponding to wet-bulb temperatures of 158° F. to 167° F., respectively. Such lines of constant wet-bulb temperatures are shown as broken lines B—B and C—C in the accompanying graph. Drying under the above-described conditions can be effected while the filamentary material is under tension or while it is in a relaxed (untensioned) state.

Drying under the aforesaid temperature and humidity conditions is preferably effected while the gelled, polyacrylonitrile filamentary material is in a relaxed state, and has, at the start of the drying operations, a water content in excess of the critical value, using the term as it is commonly employed in chemical engineering practice (reference: Perry's Chemical Engineers' Handbook, 3d Ed., p. 802, published in 1950 by McGraw-Hill Company, New York, New York). Drying is continued under these conditions until substantially all of the water has been evolved from the filamentary material and its structure has collapsed. By controlling the relative humidity during drying at the predetermined levels, the gelled material collapses uniformly and yields a product that can be uniformly dyed and that has other improved properties such as those mentioned above. In the absence of humidity control within the aforespecified range the material, if dried at humidities lower than those specified, contains opaque, uncollapsed areas that form off-shade colors when the product is dyed; or if dried at humidities in excess of those specified the material contains areas where sections of filamentary material in contact with each other will fuse, forming a cemented structure which is difficult to separate into the original individual filaments during subsequent processing. These phenomena are particularly objectionable when handling a plurality of substantially parallel filaments as are usually encountered in commercial practice.

Any suitable method may be used in preparing the gelled, polyacrylonitrile, filamentary material. A preferred method involves dissolving an acrylonitrile polymer, that is, a homopolymer or copolymer of acrylonitrile, in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate in the water in all cases in sufficiently high so that the resulting solution will dissolve the acrylonitrile polymer. In most cases the concentration of thiocyanate is substantially above 40% (e.g., from 45–50% to 55–60%) of the total weight of the solution of thiocyanate dissolved in water, the upper limit being a saturated solution of the thiocyanate in water.

In forming the gelled, polyacrylonitrile filaments, an alkali-metal thiocyanate solution of an acrylonitrile polymer of the kind described above, after filtration and deaeration, is passed under pressure to an extrusion head and thence through the openings or orifices in a spinnerette into a liquid coagulating bath comprising an aqueous solution containing from about 3% (preferably at least about 5%) to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinnerette it coagulates or precipitates in the form of gelled filaments upon entering the above coagulating bath. (In the preferred embodiment of the invention, the coagulating bath is maintained at a temperature not exceeding +10° C. by any suitable means, and in some cases advantageously is maintained at or below 0° C., e.g., at —9° C. to —0.5° C.) By using such a coagulating bath, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of drying, great amenability to dyeing, etc.

If desired, a water-miscible alcohol also may be incorporated into the coagulating bath along with the alkali-metal thiocyanate as is described more fully in, for instance, British Patent Nos. 732,135 and 738,759. Such alcohols include methyl, ethyl, propyl, isopropyl, n-butyl, sec.-butyl and tert.-butyl alcohols, which constitute a preferred class because of their relatively low boiling points; although one can also use the higher monohydric alcohols as well as the various polyhydric alcohols (e.g., dihydric, trihydric, etc.), these are less desirable from an economic and operating standpoint. The alcohol, if employed, generally constitutes at least 4%, e.g., from 5% to 15%, by weight of the bath.

Instead of, or in addition to, the modification which comprises incorporating an alcohol in the coagulating bath, one can also add an alcohol to the spinning solution as is described more fully in, for instance, British Patent No. 714,530.

When alcohol is a component of the spinning solution, or the coagulating bath, or both, the bath temperature may range, for instance, from −15° C. to +10° C., as in the aforementioned U.S. Patent No. 2,558,730, or at higher temperatures ranging, for example, up to 40° C. The gelled, polyacrylonitrile filamentary material obtained under these conditions is a hydrogel-alcogel product, that is, it contains both water and alcohol in the gel structure in addition to the alkali-metal thiocyanate and the polyacrylonitrile.

After emerging from the coagulating bath the extruded filamentary material may be given a cold solvent stretch, followed by washing and then hot stretching. If the initial stretch is omitted, the gelled filaments are suitably treated for the removal of thiocyanate immediately after leaving the coagulating bath. Such a treatment may take various forms, e.g., washing either in a series of troughs or while passing over a series of upper and lower serpentine rolls, the lower rolls of the series being immersed (or partly immersed) in a series of wash troughs. If serpentine washing technique be employed, the rolls over which the filaments pass during the washing step may all operate at the same peripheral speed or with each or some at a peripheral speed slightly lower than the one immediately preceding it in the series. Washing may be done with water alone at normal (e.g., 15°–30° C.) or at an evelated temperature (e.g., 35°–50° C.), or even at a reduced temperature (e.g., 1° C. up to 15° C.); or, if desired, one could use mixtures of water and an alcohol (e.g., ethanol), or other solvents. If desired, a series of countercurrent wash troughs or vessels can be used, or any other suitable washing devices.

After washing, the gelled, polyacrylonitrile, filamentary material is hot-stretched, e.g., between rolls (or series of rolls) the latter of which are operated at a higher peripheral speed than the former. This stretch is effected while the gelled material is in contact with moisture and at a temperature within the range of about 70° C. to about 110° C., preferably while it is in contact with water at a temperature of about 70° C. to about 100° C. When temperatures above 100° C. are to be employed, the medium may be steam or hot water under superatmospheric pressure. Good results are obtained when the aqueous fluid medium in which the gelled, filamentary material is stretched is water within the range of about 90° C. to about 100° C. The degree of stretch may be widely varied but generally is from three to fifteen times the length of the unstretched material. If the freshly extruded, gelled filaments have been given a cold, solvent stretch (e.g., as is more fully disclosed in the copending application of P. W. Cummings, Jr., Serial No. 554,155, filed December 20, 1955), then the washed, filamentary material (or filamentary material which has been otherwise treated for the removal of thiocyanate) is generally stretched to between one and one-half and ten times its once-stretched length, the second stretch being correlated with the first stretch so that the total stretch is to from three to fifteen times he length of the said filamentary material immediately before the first stretch.

After being hot-stretched, the filamentary material may be rinsed if desired with, for example, water. Such a rinsing operation, however, is optional and may be omitted.

Following the rinsing step (if applied to the gelled material) the gelled filaments are dried under the temperature and humidity conditions herein disclosed and claimed, thereby to collapse the structure of the fiber and to improve its useful properties.

By way of example only and not by way of limitation, it is mentioned that one suitable form of apparatus for carrying out this operation is an apron or belt dryer. With such a dryer the stretched, washed, wet filamentary material (e.g., tow), preferably having a water content in excess of the critical value, is fed to the tow-dryer belt or apron through a plaiter which spreads the tow evenly and in relaxed state over the entire dryer belt to form a uniform blanket. The belt is moving and carries the blanket of tow thereon through a hot, humidified zone or chamber which advantageously may be divided into a number of sections, e.g., three. If thusly divided into three sections, the first two sections may be designated as "drying-conditioning sections," in which the continuous filamentary material or tow is subjected to a blast of hot, humid air. Each of these two sections normally is provided with its own set of hot-air blowers, steam-heated, air-heating coils, and humidifier steam nozzles. The third or last section may be designated as a "calming compartment" since, in this compartment, the blanket is not agitated by direct air blasts.

Such a method of drying, utilizing a belt or apron dryer, is shown somewhat schematically and for purpose of illustration only in Fig. 2 of the accompanying drawing.

The filamentary material issuing from the exit end of the dryer has a substantially uniformly collapsed structure and properties such as hereinbefore described; and, after leaving the dryer, is fed to subsequent processing operations. For example, the dried (collapsed) material may be crimped and further processed to yield a product which is sold as tow, or, after crimping, it may be cut to staple lengths and further processed to yield staple fibers which are baled and sold as such.

Optimum performance of a dryer of the kind above described depends upon such influencing variables as air temperature and air humidity in each drying section, and the residence time. The latter may be defined as the number of minutes it takes any part of the filamentary material or tow to pass entirely through the first two sections wherein heat and humid conditions are applied. Ordinarily, the residence time will range between 10 and 60 minutes, more particularly from 15 to 45 minutes.

In order that those skilled in the art better may understand how the present invention can be carried into effect, the following examples are given by way of illustration and not by way of limitation. All parts and percentages are by weight.

EXAMPLE 1

A terpolymer is made from a monomeric mixture of 7.5% vinyl acetate, 7.5% 2-methyl-5-vinylpyridine and 85% acrylonitrile by polymerizing in an aqueous medium with an oxidation-reduction catalyst system comprised of chloric acid and sulfurous acid by known methods, e.g., as described in Cresswell U.S. Patent No. 2,751,374, dated June 19, 1956. The composition of the resulting terpolymer, calculated on a salt-free basis (that is, in freeform), is about 88% acrylonitrile, about 6.4% 2-methyl-5-vinylpyridine and about 5.6% vinyl acetate. This polymer is washed and then dissolved in 47% aqueous sodium thiocyanate to make a solution containing about 10.1% by weight of polymer. After deaeration and filtration the polymer solution is preheated and then extruded through a spinnerette having 2330 holes of 90 microns diameter into a coagulating bath of 10% aqueous sodium thiocyanate solution at −2° C. Spinning is done at 80 meters per minute (final speed).

The gelled tow is given a cold solvent stretch of 300%, washed, and then stretched 339% in water at 100° C.

Samples of this tow are tray-dried for ½ hour under varying conditions of temperature and humidity as described below, together with the results. The drying period of ½ hour is sufficient to cause substantially all of the water to be evolved from the gelled tow and collapse of its structure.

Table

| Dry Bulb, °F. | Wet Bulb, °F. | Approx. R. H., Percent |
|---|---|---|
| 260 | 160 | 12 |
|  | 145 | 6 |
|  | 130 | 4 |
| 245 | 215 | 60 |
|  | 200 | 44 |
|  | 185 | 30 |
|  | 175 | 26 |
|  | 160 | 16 |
|  | 145 | 11 |
|  | 130 | 5 |
| 230 | 185 | 40 |
|  | 170 | 27 |
|  | 155 | 21 |
|  | 140 | 15 |
|  | 125 | 7 |
| 215 | 185 | 53 |
|  | 170 | 37 |
|  | 155 | 25 |
|  | 140 | 17 |
|  | 125 | 10 |
| 200 | 140 | 24 |
|  | 125 | 13 |

The filaments produced by heating under the foregoing conditions of temperature and humidity are, in general, glossy and slightly yellow in color, fluffy to the touch and substantially uniform in appearance throughout. In marked contrast, those which are subjected to temperature conditions materially to the left of the aforementioned line A—A of the accompanying graph (Fig. 1) are, in general, non-uniform and have dull white spots or streaks; while those dried under conditions materially to the right of line D—D of the aforesaid graph are straw-like, stiff to the touch and more yellow in color.

It has been found that a glossy appearance and the absence of dull white spots or streaks are indicative of well-collapsed polyacrylonitrile fiber material; that is, material which is substantially non-porous. When viewed in cross-section under the microscope such material presents a bright, uniform picture in contrast to porous, non-collapsed filaments which show non-uniform cross-sections, exhibiting a definite skin/core structure. If the filaments have been non-uniformly or insufficiently collapsed, then the properties of the product (especially uniformity of dyeings) are adversely affected. Likewise, if the filaments have been dried under conditions leading to a strawlike, stiff hand, the ability of the material to be processed in subsequent operations suffers because the fused or cemented filaments do not separate into individual fibers, although, in general the dyeability of such fused filaments is unaffected.

Swatches of the dried filaments, that is, filaments with collapsed structure produced as described in the table, are dyed with an acid dye, specifically Calcofast Alizarine Blue SAPG (Color Index No. 1054), and with a premetallized acid dye, specifically Calcofast Wool Blue 2G (Color Index Prototype No. 144). With the former, dyeing is effected by immersing the dried swatches in an aqueous dye bath containing 2% of the aforesaid Calcofast Alizarine Blue SAPG, 2% 66° Bé. sulfuric acid and 10% Glauber's salt; and with the latter, in an aqueous dye bath containing 2% of the aforesaid Calcofast Wool Blue 2G, 6% 66° Bé. sulfuric acid and 5% Glauber's salt. All percentages are based on the weight of the swatch. The ratio of the volume of the bath to that of the swatches is approximately 50 to 1. The swatches are dyed by boiling in the described dye bath for 1 hour, after which they are rinsed, dried and inspected.

No appreciable differences in strength or shade are noted on the individual dyeings. No loss in dyeability is evident on samples subjected to standard moist- or dry-heat exposure. Uniformity of dyeing is commercially satisfactory in all dyeings, and properly can be rated as "good" in nearly all cases and "fair-to-good" on the remainder.

Instead of the filamentary copolymer of acrylonitrile, vinyl acetate and 2-methyl-5-vinylpyridine employed in Example 1 there can be used, in making the filaments, homopolymeric acrylonitrile or one of the following acrylonitrile copolymers:

95% acrylonitrile and 5% 2-vinylpyridine
92% acrylonitrile and 8% 2-methyl-5-vinylpyridine
95% acrylonitrile and 5% 2-vinyl-ethylpyridine
85% acrylonitrile, 7.5% methyl acrylate and 7.5% 2-vinylpyridine
84% acrylonitrile, 8% acrylamide and 8% 2-methyl-5 vinylpyridine
90% acrylonitrile, 5% hydroxyethyl methacrylate and 5% 2-methyl-5-vinylpyridine
86% acrylonitrile, 7% allyl alcohol and 7% 2-vinyl-5-ethylpyridine (or 7% 2-methyl-5-vinylpyridine)

Such filamentary polyacrylonitrile is processed as described under Example 1 with similar results.

EXAMPLE 2

A terpolymer is made from a monomeric mixture of 8% vinyl acetate, 8% 2-methyl-5-vinylpyridine and 84% acrylonitrile in the same manner as described in Example 1. This polymer is treated and dissolved as described in Example 1, and the deaerated, filtered and preheated polymer solution is extruded through three spinnerettes each having 6372 holes of 65 microns diameter into a coagulating bath of 10.0% aqueous sodium thiocyanate solution at —2° C. Spinning is done at 90 meters per minute (final speed).

The gelled tow is given a cold stretch of 107%, washed, rinsed in aqueous ammoniacal solution of pH 9, and stretched 655% in water at 96° C. Samples of this tow are dried in an open-end tube by passing over them preheated and prehumidified air. Samples are withdrawn from the tube when no further loss of weight is noted and substantially all of the water has been evolved. Cross-sections of the entire tow are examined microscopically for evidence of collapsed fibers, and the extent of collapse is estimated as that fraction of individual filaments which has collapsed.

Table 2

| Dry Bulb, °F. | R.H., Percent | Wet Bulb, °F. | Extent of Collapse (as fraction of all fibers) |
|---|---|---|---|
| 140 | 5 | 80 | 0. |
| 176 | 2 | 90 | 1. |
| 212 | 1 | 93 | 2. |
| 212 | 9.2 | 121 | 96. |
| 212 | 10 | 122 | 98. |
| 212 | 17.4 | 140 | 99. |
| 212 | 29.4 | 158 | 100. |
| 212 | 46.3 | 176 | 100 (incipient fusion). |
| 248 | 0 | 94 | 10. |
| 248 | 1.1 | 103 | 30. |
| 248 | 4.8 | 126 | 98. |
| 248 | 13.5 | 154 | 100. |
| 248 | 15.8 | 162 | 100. |
| 248 | 18.2 | 167 | 100 (incipient fusion). |

The temperature and relative humidity data given in the foregoing Table 2, and in Table 1 shown in Example 1, provide the basis for the graph shown in Fig. 1 of the accompanying drawing. The area between lines A—A (minimum relative humidity, corresponding to a wet-bulb temperature of 122° F.) and the solid line D—D (maximum relative humidity, corresponding to a wet-bulb temperature of 176° F.) constitutes the range within which satisfactorily collapsed, non-fused material is produced. In particular, the area bounded by the lines B—B and C—C (relative humidities corresponding to constant wet-bulb temperatures of 158° F. and 167° F., respectively) was found to produce material which is substantially 100% collapsed and of sufficiently non-strawlike hand to constitute satisfactory product for subsequent textile processing, dyeing and finishing operations.

EXAMPLE 3

A filamentary polyacrylonitrile is produced from a copolymer of 95% acrylonitrile and 5% methyl acrylate in essentially the same manner described under Example 1 with the exception that spinning is done at 100 meters per minute (final speed). A sample of the gelled tow is heat-treated for ½ hour to collapse its structure at a dry-bulb temperature of 215° F./wet-bulb temperature of 160° F., which corresponds to a relative humidity of approximately 29%. The resulting product has a glossy appearance and contains no dull white spots or streaks, indicating that the structure has been substantially uniformly collapsed, and that the material is practically completely non-porous. This is substantiated by the fact that when swatches of the heat-treated material are individually and competitively dyed with a basic dye and a dispersed dye in accordance with conventional practice, good uniformity of dyeing and a relatively high exhaust (70%) of the dye bath during dyeing are obtained.

In marked contrast when a sample of the gelled tow is air-dried the dried product contains many dull white spots; and some dull white spots when samples are heated for ½ hour under these conditions:

| Temp., ° F. | Approx. Percent Relative Humidity |
| --- | --- |
| 200 dry/110 wet | 7 |
| 240 dry/120 wet | 4 |

The structures of the dried products are incompletely collapsed and have a substantial degree of porosity as evidenced by the aforementioned appearances of each; and by the non-uniformity of dyeings made as described above.

Similar results are obtained with similarly produced and heat-treated filamentary material comprised of one of the following acrylonitrile copolymers:

Copolymer composition:
  95% acrylonitrile and 5% vinyl acetate
  90% acrylonitrile and 10% methyl acrylate
  95% acrylonitrile and 5% acrylamide
  92% acrylonitrile and 8% dimethylaminoethyl methacrylate
  90% acrylonitrile, 5% vinyl acetate and 5% methyl acrylate
  90% acrylonitrile, 5% methacrylonitrile and 5% vinyl acetate The preferred filament-forming acrylonitrile polymers that are used in making filaments, which subsequently are heat-treated in accordance with the present invention, are those containing, by weight, a major proportion (more than 50%) of acrylonitrile and a minor proportion (less than 50%) of a vinylpyridine combined in the polymer molecule, and especially those containing, by weight, at least 80% acrylonitrile and at least 2% of a vinylpyridine (preferably a methyl vinylpyridine including 2-methyl-5-vinylpyridine). A preferred sub-class within this broader class is that comprised of filament-forming copolymers of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate; the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes; isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through line 27 in column 5). The "third different monoethylenically unsaturated material" mentioned above includes within its meaning a plurality of such materials.

Vinylpyridines which can be employed in making copolymers with acrylonitrile, and used as herein described, are vinylpyridines represented by the formula (I)
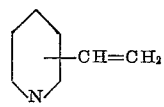

and which include 2-vinylpyridine, 3-vinylpyridine and 4-vinylpyridine; methyl vinylpyridines represented by the formula (II)
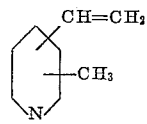

and which include 2-methyl-3-vinylpyridine, 3-vinyl - 4- methylpyridine, 3-vinyl-5 - methylpyridine, 2 - vinyl - 3- methylpyridine, 2 - vinyl - 4 methylpyridine,2-vinyl - 5- methylpyridine, 2 - vinyl - 6 - methylpyridine, 2-methyl-4-vinylpyridine and 3-methyl - 4 - vinylpyridine. The vinylpyridines embraced by Formula II are a preferred subgroup within a broader class of vinylpyridines that are advantageously employed in making copolymers which, in filamentary form, are used in practicing the present invention and which may represented by the formula (III)
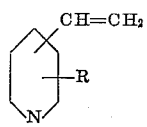

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula (IV)
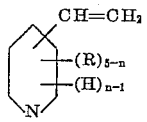

wherein R represents a lower alkyl radical, examples of which have been given hereinbefore, and $n$ represents an integer from 1 to 5, inclusive.

One can substitute in the copolymers mentioned under Example 1 an equivalent amount of any of the vinylpyridines, of which numerous examples have just been given, for the specific vinylpyridine named in the individual copolymer, and then make spinning solutions from which filamentary polyacrylonitrile is produced and heat-treated in accordance with the present invention.

When dye receptivity, especially toward acid dyes, is a matter of secondary consideration, the vinylpyridine can be omitted from the above-described formulations for making the copolymer.

Ordinarily, the molecular weight (average molecular weight) of the acrylonitrile homopolymer or copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a filament-forming material and such polymers can, therefore, be used in forming the spinning solutions from which are made the gelled filaments that are treated in accordance with the present invention.

The spinning solutions employed are preferably those produced by dissolving the polymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchorate, calcium nitrate, zinc nitrate, etc. As indicated hereinbefore, the preferred salt is an alkali-metal thiocyanate, specifically sodium thiocyanate. Other examples of suitable solvents are concentrated aqueous solutions of guanidine thiocyanate, the mono-(lower alkyl)-substituted guanidine thiocyanates, and the symmetrical and unsymmetrical di-(lower alkyl)-substituted guanidine thiocyanates.

Filaments spun from organic-solvent solutions of an acrylonitrile polymer, and which are wet-spun into a coagulating bath comprising water to form the gelled filamentary material, are amenable to treatment in accordance with the present invention. In making such spinning solutions the organic solvent can be dimethyl formamide or any of the other organic solvents described in the U.S. patents mentioned in the last sentence of the second paragraph of this specification, and especially those which are soluble in or miscible with water.

The concentration of the acrylonitrile polymer in the chosen solvent should be such that a composition having a workable viscosity is obtained. This concentration will depend, for example, upon the particular solvent and extrusion apparatus employed, the diameter of the filament or other shaped article to be extruded and the average molecular weight of the polymer. The concentration may range, for example, from 6% or 7% up to 16% or 18% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of the acrylonitrile polymer that is consistent with solubility and viscosity characteristics. The chosen concentration may, however, require that consideration be given to other influencing factors, e.g., the optimum spinning speed for the particular production unit.

The gelled polyacrylonitrile filamentary material can be conditioned, that is, heat-treated under controlled and correlated conditions of temperature and humidity as hereinbefore described, by batch, semicontinuous or continuous technique.

Our invention provides an economical and efficient method of producing a substantially uniform product from a gelled polyacrylonitrile filamentary material and in which the structure has been substantially uniformly collapsed so that substantially uniform and "on-shade" dyeings are obtained. The invention obviates the production, from such gelled filamentary material, of products having opaque, uncollapsed areas that give "off-shade" dyeings of such areas; that is, non-uniform dyeings. Furthermore, it obviates the production, from such gelled filamentary material, of products having a straw-like, stiff nature that are formed by the fusion or cementing together of the filaments, and in which condition difficulties in subsequent textile operations are encountered.

We claim:

1. The method of collapsing the structure of gelled filamentary material comprised of water and a fiber-formable acrylonitrile polymer containing a major proportion by weight of combined acrylonitrile, said method comprising drying the said filamentary material in a drying atmosphere under correlated conditions of temperature and humidity, the temperature (dry bulb) of said atmosphere being within the range of from 200° F. to 260° F., the minimum and maximum percentages of relative humidity for a particular dry-bulb temperature being those falling between the lines A—A and D—D of the graph shown in Fig. 1 of the accompanying drawing, and the said drying under the said temperature and humidity conditions being continued until substantially all of the water has been evolved from the said filamentary material and its structure has collapsed.

2. The method as in claim 1 wherein the gelled filamentary material is in relaxed state during drying under the defined conditions of temperature and humidity.

3. The method as in claim 1 wherein the fiber-formable acrylonitrile polymer is a fiber-formable copolymer containing at least 80% by weight of combined acrylonitrile and the remainder being comprised of at least one different monoethylenically unsaturated substance which is copolymerizable with acrylonitrile to yield the said copolymer.

4. The method as in claim 3 wherein the different monoethylenically unsaturated substance which is copolymerizable with acrylonitrile to yield the fiber-formable copolymer includes a vinylpyridine.

5. The method as in claim 4 wherein the vinylpyridine comprises 2-methyl-5-vinylpyridine.

6. The method as in claim 3 wherein the different monoethylenically unsaturated substance which is copolymerizable with acrylonitrile to yield the fiber-formable copolymer includes vinyl acetate and a vinylpyridine.

7. The method as in claim 6 wherein the different monoethylenically unsaturated substance which is copolymerizable with acrylonitrile to yield the fiber-formable copolymer includes from 2% to 10% by weight of vinyl acetate and from 2% to 10% by weight of 2-methyl-5-vinylpyridine.

8. The method of collapsing the structure of gelled filamentary material comprised of water and a fiber-formable acrylonitrile polymer containing a major proportion by weight of combined acrylonitrile, said method comprising drying the said filamentary material, in a relaxed state, in a drying atmosphere under correlated conditions of temperature and humidity, the temperature (dry bulb) of said atmosphere being within the range of 200° F. to 260° F., the minimum and maximum percentages of relative humidity for a particular dry-bulb temperature being those falling between the broken lines BB and CC of the graph shown in Fig. 1 of the accompanying drawing, and the said drying under the said temperature and humidity conditions and while the said filamentary material is in a relaxed state being continued until substantially all of the water has been evolved from the said filamentary material and its structure has collapsed.

References Cited in the file of this patent

UNITED STATES PATENTS

| | | |
|---|---|---|
| 2,404,714 | Latham | July 23, 1946 |
| 2,558,732 | Cresswell | July 3, 1951 |
| 2,677,591 | Moody | May 4, 1954 |

UNITED STATES PATENT OFFICE
CERTIFICATE OF CORRECTION

Patent No. 2,984,912　　　　　　　　　　　　　　　　May 23, 1961

Thomas H. Robertson et al.

It is hereby certified that error appears in the above numbered patent requiring correction and that the said Letters Patent should read as corrected below.

Column 2, line 47, for "stop" read -- top --; column 4, line 69, for "great" read -- greater --; column 5, line 40, for "evelated" read -- elevated --; line 71, for "he" read -- the --; column 6, line 63, for "free-" read -- free-base --; column 8, line 13, for "2-vinyl-ethylpyridine" read -- 2-vinyl-5-ethylpyridine --.

Signed and sealed this 7th day of November 1961.

(SEAL)
Attest:

ERNEST W. SWIDER　　　　　　　　　　　　　　　　DAVID L. LADD
Attesting Officer　　　　　　　　　　　　　　　　Commissioner of Patents

USCOMM-DC